United States Patent [19]

Maus et al.

[11] Patent Number: 4,732,177
[45] Date of Patent: Mar. 22, 1988

[54] HOT GAS CONTAINER WITH INSULATION FORMED OF OVERLAPPING CERAMIC BODIES

[75] Inventors: Wolfgang Maus, Bergisch-Gladbach; Rolf Miebach, Overath-Volkerath; Helmut Swars, Bergisch-Gladbach, all of Fed. Rep. of Germany

[73] Assignee: Interatom GmbH, BergischGladbach, Fed. Rep. of Germany

[21] Appl. No.: 684,053

[22] Filed: Dec. 20, 1984

[30] Foreign Application Priority Data

Dec. 21, 1983 [DE] Fed. Rep. of Germany ....... 3346230

[51] Int. Cl.⁴ ............................................. F16L 9/14
[52] U.S. Cl. .................................. 138/147; 138/149; 376/291
[58] Field of Search ................ 138/147, 149; 376/291, 376/381

[56] References Cited

U.S. PATENT DOCUMENTS 2,451,145 10/1948 Baker et al.
2,532,190 11/1950 Pirani et al.
3,963,936 6/1976 Lowe.
4,061,162 12/1977 Jones et al. ........................ 138/149
4,259,993 4/1981 Scholz ................................ 376/291
4,284,106 8/1981 Haas et al. ......................... 138/147

FOREIGN PATENT DOCUMENTS 0000497 2/1979 European Pat. Off.
3147725 6/1983 Fed. Rep. of Germany.
3208883 9/1983 Fed. Rep. of Germany.
2248582 5/1975 France.
2309019 11/1976 France.
2393405 12/1978 France.
2505977 11/1982 France.
1207036 9/1970 United Kingdom.

Primary Examiner—Deborah L. Kyle
Assistant Examiner—Richard W. Wendtland
Attorney, Agent, or Firm—Herbert L. Lerner; Laurence A. Greenberg

[57] ABSTRACT

Hot gas container, including a pressure-proof metallic outer shell having an inner surface, thermal insulation covering the inner surface in the form of ceramic bodies each having a given surface, the bodies partially axially overlapping each other over at least the larger part of the given surface thereof, and anchors fastening the bodies to the outer shell, the anchors being welded to the outer shell, engaged in recesses formed in the bodies and covered by the outer shell and the bodies.

8 Claims, 6 Drawing Figures

HOT GAS CONTAINER WITH INSULATION FORMED OF OVERLAPPING CERAMIC BODIES

The invention relates to a hot gas container, especially a pipeline having a pressure-proof metallic outer shell, thermal insulation covering the inner surface of the outer shell in the form of ceramic bodies partially axially overlapping each other, and covered anchors welded to the outer shell and engaging recesses formed in the bodies for fastening the bodies.

Such hot gas pipelines are used, for instance, in nuclear power plants which are operated with a high-temperature nuclear reactor. Pressure loads of 40 bar at temperatures of 950° C., for instance, must be assumed for such a use. Since no materials are available which can be formed into pipes and can permit the enclosure of helium, for instance, at the high temperatures and pressures mentioned above, containers are to be used for this purpose where of the metallic outer shell provides the pressure enclosure and the shell is protected against excessive temperatures by insulation attached in the interior thereof. The insulating materials to be considered are primarily ceramic materials in the form of fibers, blocks or stone. The disadvantage of these materials is that unavoidably, gaps occur between the individual blocks through which hot gas could reach the metallic outer shell. The sealing of these gaps present problems, as seen in German Published, Non-Prosecuted application DE-OS No. 31 47 725. It has also been found that insulating blocks which must break down the entire temperature span of 950° C. to about 300° C. (the highest permissible temperature for the metallic outer shell), have a tendency to form cracks, causing the insulation to be destroyed prematurely. While fiber insulation can be made without gaps, it must be protected especially against the gas flow prevailing in the interior of the tank and it can only be manufacture with great difficulties with the required uniform density and resulting insulating action. Very long exposure times are required when dealing with the construction of nuclear reactors (up to 30 years). Therefore, it has not been possible to prove that fiber materials retain their elasticity, which is required in order to ensure the closing of the gaps between the individual bales or mats etc.

It has therefore been proposed (see German Published, Non-Prosecuted Application DE-OS No. 32 08 883) to place the insulating fiber material in boxes formed of a thin, highly temperature-resistant sheet metal and to line the pipeline, i.e. a container with rotational symmetry, with such boxes. The boxes are in the shape of sectors of a hollow cylinder and the sealing of the gaps between the boxes is accomplished by providing tabs on the boxes which overlap the gap and overlap the adjoining box over a short distance. However, this structure seems to be suitable only for somewhat lower temperature ranges, in view of its mostly metallic construction. Those in the field prefer block-shaped material for insulation since the density conditions can be defined better and are unchanged over the life span.

It is accordingly an object of the invention to provide a hot gas container with insulation formed of overlapping ceramic bodies, particularly a pipeline or the individual parts required for its construction, which overcomes the hereinafore-mentioned disadvantages of the heretofore-known devices of this general type, in which each of the ceramic bodies only need to break down part of the temperature span between the inside of the container and the outer pressure containment shell, in which a reliable sealing of the gaps between the individual blocks and between the blocks and the outer shell is ensured, and in which a safe connection which can be readily established during the installation is ensured between the individual blocks and is preserved even if an individual block acquires cracks due to temperature variations or the like.

With the foregoing and other objects in view there is provided, in accordance with the invention, a pressure-proof metallic outer shell having an inner surface, thermal insulation covering the inner surfac in the form of ceramic bodies each having a given surface, the bodies partially axially overlapping each other over at least the larger part of the given surface thereof, and anchors fastening the bodies to the outer shell, the anchors being welded to the outer shell, engaged in recesses formed in the bodies and covered by the outer shell and the bodies. Due to the fact that the individual parts mostly overlap (and completely overlap in the ideal case), the insulation is constructed of two or more layers each of which only needs to break down a smaller temperature span as compared to conventional insulation constructed of several layers. Furthermore, the insulation of the invention has the advantage that each individual body is nevertheless fastened directly to the outer pipe and thus has a more secure support, which is also aided by the mutual support of the blocks among each other.

In accordance with a further feature of the invention, the ceramic bodies are spaced from each other and from the outer shell defining gaps therebetween and including plastically deformable insulating material and gas-impermeable foils extending axially and circumferentially in the gaps. This structure secures the metallic outer shell in a reliable manner against contact with hot gases, since the gaps between the individual blocks become pockets which are self-enclosed and in which the gas stagnates and thus supplements the insulation. The fiber material only serves displacement functions but not a sealing function. There are also no reservations regarding durability, since elasticity of the materials used for fillers need not be kept permanently for this purpose.

In accordance with an added feature of the invention, the outer shell is rotation-symmetrical, and the ceramic bodies are in the shape of a sector of at least two hollow cylinders having different diameters and at least one truncated hollow cone interconnecting the hollow cylinders, the outside diameter of the smaller cylinder being only slightly smaller than the inside diameter of the larger cylinder. This structure defines a first form of ceramic bodies or blocks which can be used for lining the rotation-symmetrical container according to the invention. It is left to the discretion of the user of the device not to use the simple stepped form described herein, but to instead analogously construct a multiple-stepped form.

In accordance with yet a further feature of the invention, there are provided pins disposed in axial direction in recesses formed in the bodies interconnecting the bodies. In this way an additional form-locking connection between the individual bodies is established, so that even bodies which have been split by a crack into two parts, are kept in their position. A form-locking connection is one in which parts are locked together by virtue of their own shape.

In accordance with yet an additional feature of the invention, the recesses are at least partially conical. This facilitates the assembly of the insulation, by permitting the compensation of unavoidably existing tolerances of the individual blocks and also of the outer pipe.

In accordance with yet an added feature of the invention, the outer shell is rotation-symmetrical, and the ceramic bodies are in the shape of a sector of a truncated hollow cone having larger and smaller ends, and an inwardly conically-bevelled cylinder adjacent the larger end of the hollow cone.

In accordance with a concomitant feature of the invention, the thermal insulation has a given thickness, and the anchors are each in the form of a hollow cylinder having two ends, one of the ends having a flange disposed thereon and the other of the ends being welded to the outer shell while engaging a respective one of the bodies after the body is disposed in the outer shell, and insulating material subsequently filling the hollow cylinder disposed in the outer shell, the hollow cylinder having a length being at most one-half of the given thickness. The advantage of this anchor is that it only needs to be fastened to the bodies after the corresponding body has been fitted in place, so that the compensation of tolerances is likewise facilitated. The anchor can then be welded to the outer shell from the inside of the shell. At the same time, the anchor is protected against the action of the high temperature by at least one-half of the thickness of the insulating layer.

Other features which are considered as characteristic for the invention are set forth in the appended claims.

Although the invention is illustrated and described herein as embodied in hot gas container with insulation formed of overlapping ceramic bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
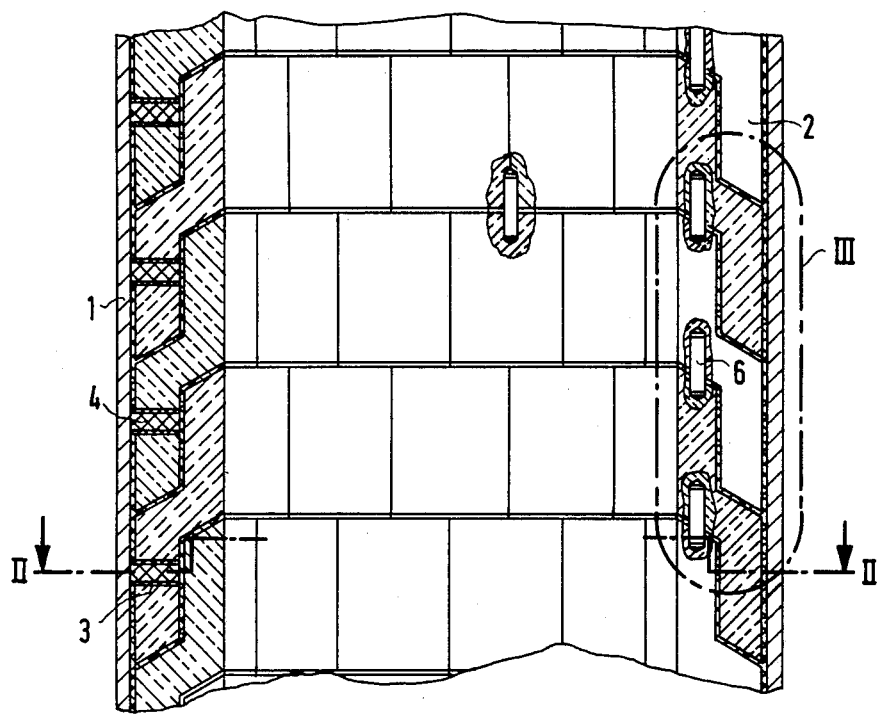
FIG. 1 is a diagrammatic, longitudinal axial cross-sectional view of a first embodiment of the container of the invention in the form of a pipeline, taken along the line I—I in FIG. 2 in the direction of the arrows.
Figure 2:
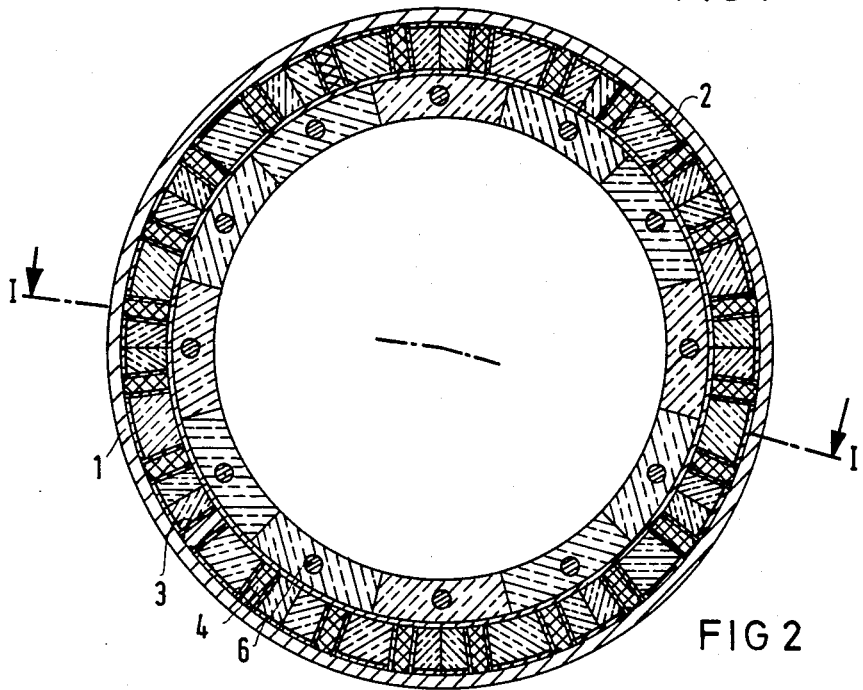
FIG. 2 is a cross-sectional view taken along the line II—II in FIG. 1 in the direction of the arrows.
Figure 3:
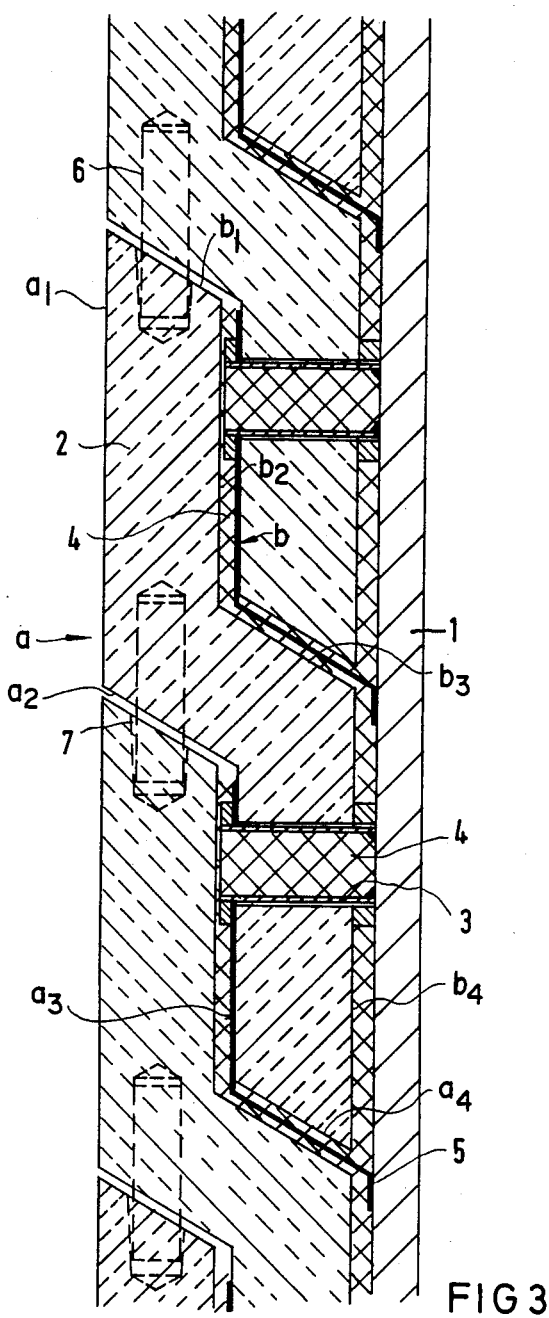
FIG. 3 is an enlarged view of the portion III of FIG. 1.
Figure 4:
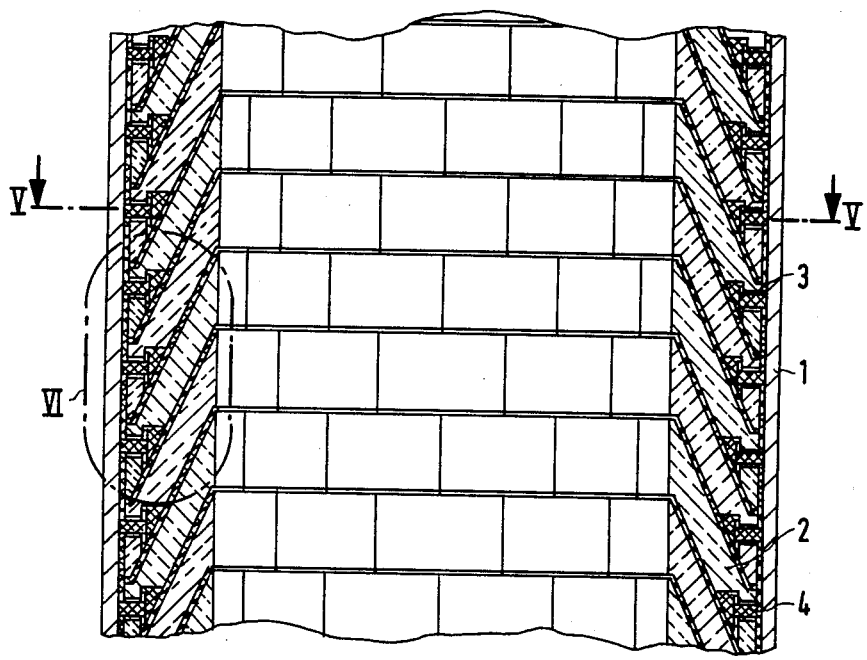
FIG. 4 is a view similar to FIG. 1 of a second embodiment of the invention, taken along the line IV—IV in FIG. 5 in the direction of the arrows.
Figure 5:
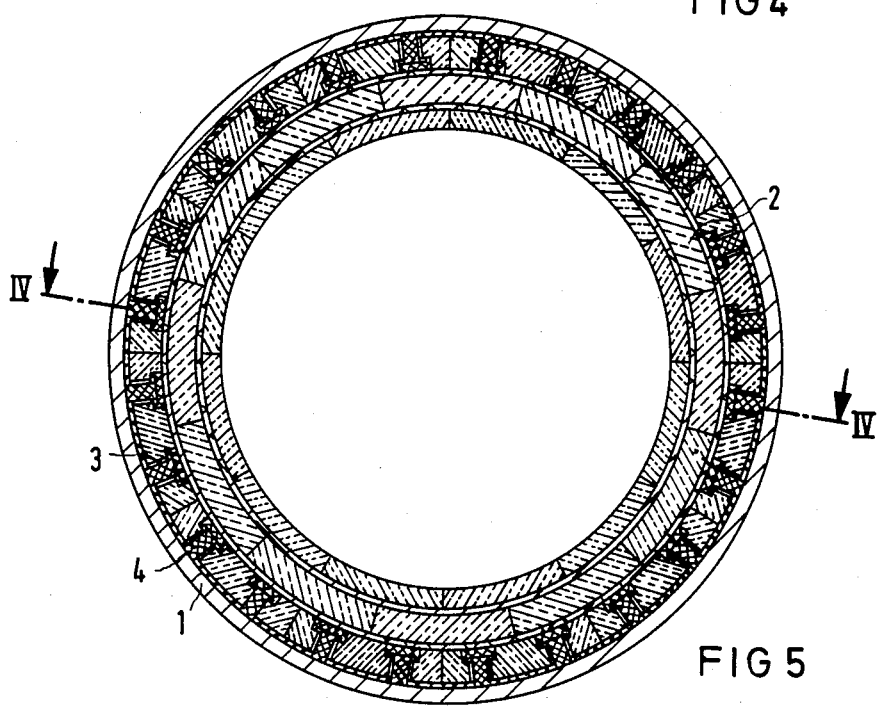
FIG. 5 is a view similar to FIG. 2, taken along the line V—V in FIG. 4 in the direction of the arrows.
Figure 6:
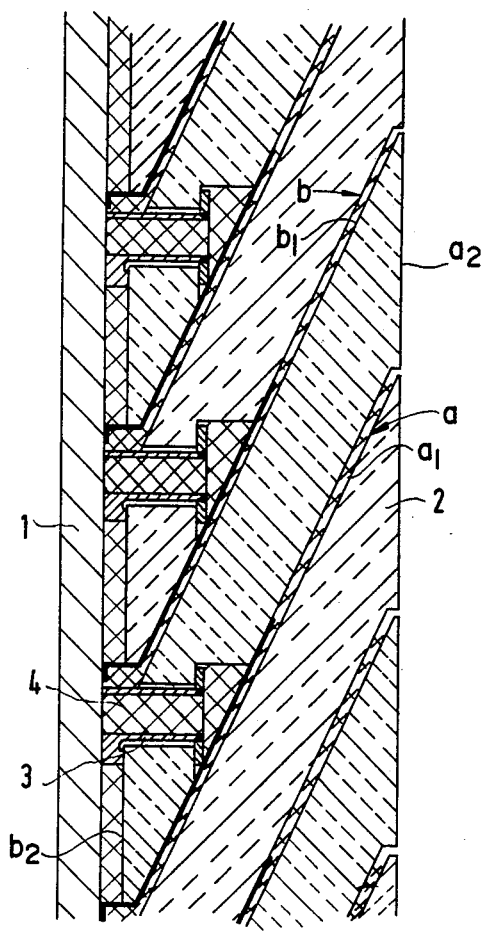
FIG. 6 is an enlarged view of the portion VI of FIG. 4.

Referring now to all the figures of the drawings as a whole, there is seen a pipeline formed of a metallic outer pipe or shell 1 which is welded together from individual sections of any desired length and ensures that the pressure containment will not be exposed to a temperature above 300° C. Insulation which is assembled from individual ceramic bodies 2 is disposed in the interior of the pipeline. The ceramic bodies are mutually offset in a manner which is known from a tile roof. In FIGS. 1 to 3 each of the bodies is shaped like a sector of two hollow cylinders connected to each other by a truncated hollow cone of different diameter. In FIGS. 4 to 6 each of the bodies is shaped like a section of a truncated hollow cone, which is followed at its furthest end by a cylinder that is conically bevelled on the inside thereof. The bodies are pushed sequentially on top of each other during the assembly.

In the case of the embodiment shown in FIGS. 4 to 6 the overlap is complete, i.e. two complete insulating layers are provided between the outer pipe 1 and the inside of the pipeline in which, for instance, helium at a temperature of 950° C. flows in the direction indicated by the arrow. In FIG. 6 the radically inner surface a is made up of two partial surfaces $a_1$-$a_2$ and the radially outer surface b is made up of two partial surfaces $b_1$-$b_2$. The entire radially inner partial surface $a_1$ and the entire radially outer partial surface $b_1$ of each body 2 is covered by an adjacent body.

In the embodiment shown in FIGS. 1 to 3, the overlap is not complete, but the truncated hollow cone making the connection between the hollow cylinders is also only so thin, in the direction of the normal to its surface, as to permit a breakdown of the temperature span without the occurrence of excessively large stresses in the body. Materials which are suitable for the manufacture of these bodies 2 are silicon and aluminum oxides, for instance. In FIG. 3, the radially inner surface a is made up of four partial surfaces $a_1$-$a_4$ and the radially outer surface b is made up of four partial surfaces $b_1$-$b_4$. The larger parts of the surfaces a and b are covered by adjacent bodies, since the partial surfaces $a_2$-$a_4$ and $b_1$-$b_3$ completely covered.

Every body 2 is fastened by means of an anchor 3 which is formed of a short section of pipe having one end of a flange and another end which is welded to the outer pipe 1. More specifically, the anchor is welded after the corresponding block or body 2 which is provided with a hole for this purpose, has been brought into its correct position. The interior of the anchor 3 is then filled, such as with insulating material 4 in fiber form which may be plastically deformable. The gaps between the individual bodies 2 and between the bodies and the outer pipe 1, are also filled with the same material, so that the tolerances which are rather considerable at times and must be expected in commercially available pipes of this order of magnitude (for instance 1000 mm in diameter), can be compensated In addition, a gas-impermeable metallic foil 5 may be placed into gaps. The foil extends both axially and in the circumferential direction and is welded to the outer pipe 1. The foil subdivides the insulation into individual smaller regions. The regions are not connected with each other, the gas carried in the piping stagnates in the regions and no appreciable convection currents can occur therein; the stagnating gas which fills the gaps contributes in its own right to the insulation. In the embodiment according to FIGS. 1 to 3, the individual bodies 2 are additionally pinned to each other by pins 6, which may also be made of ceramic material. In order to facilitate the assembly, holes 7 seen in FIG. 3 which are intended for receiving the pins, are conical, at least at one side thereof.

The foregoing is a description corresponding, in substance, to German application No. P 33 46 230.6, dated Dec. 21, 1983, International priority of which is being claimed for the instant application, and which is hereby made part of this application. Any material discrepancies between the foregoing specification and the specification of the aforementioned corresponding German application are to be resolved in favor of the latter.

There are claimed:

1. Hot gas container, comprising a pressure-proof metallic outer shell having an inner surface, thermal insulation covering said inner surface in the form of ceramic bodies each having given radially inner and outer surfaces, each of said given surfaces being covered over at least the larger part of said given surface by another adjacent ceramic body, and anchors fastening said bodies to said outer shell, said anchors being welded to said outer shell, engaged in recesses formed in said bodies and covered by said outer shell and said bodies, said outer shell being rotation-symmetrical, and said ceramic bodies being in the shape of a sector of at least two hollow cylinders having different diameters and at least one truncated hollow cone interconnecting said hollow cylinders.

2. Container according to claim 1, wherein said ceramic bodies are spaced from each other and form said outer shell defining gaps therebetween and including plastically deformable insulating material and gas-impermeable foils extending axially and circumferentially in said gaps.

3. Container according to claim 1, including pins disposed in axial direction in recesses formed in said bodies interconnecting said bodies.

4. Container according to claim 3, wherein said recesses are at least partially conical.

5. Container according to claim 1, wherein said thermal insulation has a given thickness, and said anchors are each in the form of a hollow cylinder having two ends, one of said ends having a flange disposed thereon and the other of said ends being welded to said outer shell while engaging a respective one of said bodies disposed in said outer shell, and insulating material filling said hollow cylinder disposed in said outer shell, said hollow cylinder having a length being at most one-half of said given thickness.

6. Hot gas container, comprising a pressure-proof metallic outer shell having an inner surface, thermal insulation covering said inner surface in the form of ceramic bodies each having given radially inner and outer surfaces, each of said given surfaces being covered over at least the larger part of said given surface by another adjacent ceramic body, and anchors fastening said bodies to said outer shell, said anchors being welded to said outer shell, engaged in recesses formed in said bodies and covered by said outer shell and said bodies, said outer shell being rotation-symmetrical, and said, ceramic bodies being in the shape of a sector of a truncated hollow cone having larger and smaller ends, and an inwardly conically-bevelled cylinder adjacent said larger end of said hollow cone.

7. Container according to claim 6, wherein said ceramic bodies are spaced from each other and from said outer shell defining gaps therebetween and including plastically deformable insulating material and gas-impermeable foils extending axially and circumferentially in said gaps.

8. Container according to claim 6, wherein said thermal insulation has a given thickness, and said anchors are each in the form of a hollow cylinder having two ends, one of said ends having a flange disposed thereon and the other of said ends being welded to said outer shell while engaging a respective one of said bodies disposed in said outer shell, and isulating material filling said hollow cylinder disposed in said outer shell, said hollow cylinder having a length being at most one-half of said given thickness.

* * * * *